US009524472B2

(12) United States Patent
Newnham et al.

(10) Patent No.: US 9,524,472 B2
(45) Date of Patent: *Dec. 20, 2016

(54) DISTRIBUTED SCALABLE INCREMENTALLY UPDATED MODELS IN DECISIONING SYSTEMS

(71) Applicant: NICE SYSTEMS TECHNOLOGIES UK LIMITED, Southampton (GB)

(72) Inventors: Leonard Michael Newnham, Buckingham (GB); Jason Derek McFall, London (GB)

(73) Assignee: NICE TECHNOLOGIES UK LIMITED, Southampton (GB)

( * ) Notice: Subject to any disclaimer, the term of this patent is extended or adjusted under 35 U.S.C. 154(b) by 453 days.

This patent is subject to a terminal disclaimer.

(21) Appl. No.: 14/143,885

(22) Filed: Dec. 30, 2013

(65) Prior Publication Data
US 2014/0114891 A1    Apr. 24, 2014

Related U.S. Application Data

(63) Continuation of application No. 13/552,519, filed on Jul. 18, 2012, now Pat. No. 8,620,840.

(60) Provisional application No. 61/509,201, filed on Jul. 19, 211.

(51) Int. Cl.
*G06F 15/18* (2006.01)
*G06N 99/00* (2010.01)
*G06K 9/62* (2006.01)

(52) U.S. Cl.
CPC ........... *G06N 99/005* (2013.01); *G06K 9/6256* (2013.01); *G06K 9/6269* (2013.01)

(58) Field of Classification Search
None
See application file for complete search history.

(56) References Cited

U.S. PATENT DOCUMENTS

| 5,467,428 | A | 11/1995 | Ulug |
| 7,676,751 | B2 | 3/2010 | Allen et al. |
| 2002/0073021 | A1 | 6/2002 | Ginsberg et al. |
| 2003/0055796 | A1 | 3/2003 | Shetty et al. |

(Continued)

FOREIGN PATENT DOCUMENTS

| WO | WO 2012/162485 | 11/2012 |
| WO | WO 2013/012898 | 1/2013 |

OTHER PUBLICATIONS

Sutton Richard et al., "Reinforcement learning: an introduction", MIT Press, Mar. 1, 1998.

(Continued)

*Primary Examiner* — Luis Sitiriche
(74) *Attorney, Agent, or Firm* — Pearl Cohen Zedek Latzer Baratz LLP

(57) ABSTRACT

In one embodiment, first weight information indicating a first set of delta values is obtained, where the first set of delta values includes a first delta value for each weight in a set of weights, the set of weights including a weight for each of a set of one or more parameters of a model. In addition, second weight information indicating a second set of delta values is obtained, where the second set of delta values includes a second delta value for each weight in the set of weights. Combined weight information including a combined set of delta values or a combined set of weights is generated based, at least in part, upon the first weight information and the second weight information.

20 Claims, 9 Drawing Sheets

(56) References Cited

U.S. PATENT DOCUMENTS

| | | |
|---|---|---|
| 2003/0149676 A1 | 8/2003 | Kasabov |
| 2004/0220834 A1 | 11/2004 | Pellinat |
| 2005/0021649 A1 | 1/2005 | Goodman et al. |
| 2006/0224535 A1 | 10/2006 | Chickering et al. |
| 2006/0282444 A1 | 12/2006 | Chen et al. |
| 2009/0043593 A1 | 2/2009 | Herbrich et al. |
| 2009/0164657 A1 | 6/2009 | Li et al. |
| 2010/0057717 A1 | 3/2010 | Kulkarni |
| 2012/0303598 A1 | 11/2012 | Newnham et al. |
| 2012/0303621 A1 | 11/2012 | Newnham et al. |
| 2013/0080358 A1 | 3/2013 | Newnham et al. |
| 2013/0080377 A1 | 3/2013 | Newnham et al. |
| 2013/0110750 A1 | 5/2013 | Newnham et al. |

OTHER PUBLICATIONS

Maei H. et al., "Convergent temporal-difference learning with arbitrary smooth function approximation", In Advance in Neural Information Processing Systems 22, pp. 1204-1212, 2009.
Russell, Stuart et al., "Artificial intelligence: a modern approach", Upper Saddle River, New Jersy: Prentice Hall, Jan. 2003, p. 111-114.

DISTRIBUTED SCALABLE INCREMENTALLY UPDATED MODELS IN DECISIONING SYSTEMS

CROSS REFERENCE TO RELATED APPLICATIONS

This application is a continuation of U.S. application Ser. No. 13/552,519 filed Jul. 18, 2012, entitled "DISTRIBUTED SCALABLE INCREMENTALLY UPDATED MODELS IN DECISIONING SYSTEMS" which in turn claims priority from U.S. Provisional Application No. 61/509,201, filed Jul. 19, 2011 both of which are incorporated by reference herein in their entirety.

BACKGROUND OF THE INVENTION

Machine learning may be applied to automatically generate an algorithm that is improved through experience. Applications of machine learning range from data mining programs that discover general rules in large data sets, to information filtering systems that automatically learn users' interests. The algorithm that is automatically generated and updated is often referred to as a model.

Typically, a machine learning system collects data over a period of time. In order to preserve resources for online services, the system generates or updates the model offline based upon the collected data. The model may then be applied to generate decisions in various scenarios.

SUMMARY OF THE INVENTION

The disclosed embodiments support the updating of a model across multiple components of a Learning Decisioning System. This may be accomplished, at least in part, through the communication of data pertaining to the model between or among the components. In this manner, the process of updating a model may be distributed among the components.

In accordance with one aspect, a model may be defined by a set of one or more equations that include a set of one or more parameters. Each of the parameters of each of the set of equations may have a corresponding weight associated therewith. Thus, a set of weights associated with the model may include a weight for each parameter in the set of parameters of the model.

In accordance with one aspect, a Learning Decisioning System includes two or more components. More particularly, the components may include two or more decisioning components. Each of the decisioning components may be statically or dynamically configured with the same model, and therefore a local copy of the same set of weights. More particularly, the set of weights may be an initial set of weights or may be an "updated" set of weights corresponding to an updated model. In addition, each of the decisioning components may implement a machine learning model to independently and incrementally update its local model by updating its local set of weights based, at least in part, upon data received or otherwise obtained by the decisioning component.

In accordance with another aspect, it is possible to determine the changes between the set of weights most recently applied by all of the decisioning components and a decisioning component's local copy of the set of weights. The weight changes may be represented as a set of delta values, where the set of delta values includes a delta value for each weight in the set of weights.

In accordance with yet another aspect, each of the decisioning components may obtain or otherwise maintain weight information that pertains to the model and is applicable to the decisioning component. Each decisioning component may be configured to generate at least a portion of the weight information, based, at least in part, upon data received or otherwise obtained by the decisioning component. The weight information may include the set of weights most recently implemented by all of the decisioning components. The weight information may also indicate the set of delta values. More particularly, the weight information may include the set of delta values generated by the decisioning component and/or may include a current local set of weights maintained at the decisioning component from which the set of delta values may be ascertained. Moreover, the weight information may further include a number of times the decisioning component has modified each corresponding weight in the set of weights (e.g., since a prior combine operation).

In accordance with yet another aspect, weight information maintained by each of the decisioning components may be "shared" among the decisioning components to enable an updated model to be generated. More particularly, the weight information may be shared directly among the decisioning components. Alternatively, the sharing of weight information among the decisioning components may be facilitated via a combiner.

In accordance with yet another aspect, the decisioning components and/or a combiner may be configured for generating a combined set of weights such that the set of weights is replaced with the combined set of weights. More particularly, the combined set of weights may be generated based, at least in part, upon weight information generated, obtained, transmitted, or otherwise provided by each of the decisioning components, as well as the prior set of weights (which may correspond to a prior combination operation). A revised model implementing the "updated" set of weights may then be applied by various components of the Decisioning System, such as the decisioning components and/or combiner.

In accordance with yet another aspect, the decisioning components and/or combiner may be configured for generating a combined set of delta values for use in generating a combined set of weights. More particularly, the combined set of delta values may be generated based, at least in part, upon the weight information (e.g., set of delta values) corresponding to each of the decisioning components. Various mechanisms may be applied for generation of the combined set of delta values. These mechanisms may be applied individually or in combination with one another to generate a combined set of delta values based, at least in part, upon the set of delta values pertaining to each of the decisioning components.

In accordance with yet another aspect, where a combiner participates in the generation of combined weight information such as a combined set of delta values or a combined set of weights, the combiner may provide the combined weight information to the decisioning components. Where the combined weight information includes a combined set of weights, each of the decisioning components may then replace its local set of weights with the combined set of weights, thereby updating the model applied by the decisioning components. Alternatively, where the combined weight information includes a combined set of delta values, each of the decisioning components may generate the combined set of weights from the combined set of delta values received from the combiner and replace its local set of weights with the combined set of weights.

In accordance with yet another aspect, the decisioning components and/or a combiner may communicate or share weight information corresponding to the decisioning components and/or combined weight information between or among one another. This may be accomplished via the transmission of messages. Moreover, the decisioning components and/or combiner may share or communicate weight information and/or combined weight information via one or more data stores. Such data stores may be directly accessible by the decisioning components and/or combiner, or a third party component may access the data stores for purposes of providing local or combined weight information to the decisioning components and/or combiner. Therefore, information may be provided between or among two or more components of a Learning Decisioning System through the use of messaging and/or one or more data store(s). Accordingly, weight information and/or combined weight information may be obtained by the decisioning components and/or combiner of a Learning Decisioning System through the use of messaging and/or one or more data store(s).

In accordance with yet another aspect, a network device implementing a decisioning component or combiner may obtain first weight information indicating a first set of delta values, where the first set of delta values includes a first delta value for each weight in a set of weights, the set of weights including a weight for each of a set of one or more parameters of a model. In addition, second weight information indicating a second set of delta values may be obtained, where the second set of delta values includes a second delta value for each weight in the set of weights. Combined weight information including a combined set of delta values or a combined set of weights may be generated based, at least in part, upon the first weight information and the second weight information.

In accordance with yet another aspect, a network device implementing a decisioning component may generate first weight information indicating a first set of delta values, where the first set of delta values includes a first delta value for each weight in a set of weights, the set of weights including a weight for each of a set of one or more parameters of a model. The network device may provide (e.g., transmit) the first weight information (e.g., to another decisioning module or to a combiner). The network device may receive or generate combined weight information including a combined set of delta values or a combined set of weights based, where the combined weight information is generated based, at least in part, upon the first weight information and second weight information.

In accordance with yet another aspect, a network device such as a decisioning component or combiner may obtain weight information indicating two or more sets of delta values. More particularly, each set of delta values may include a delta value for each weight in a set of weights, where the set of weights includes a weight for each of a set of one or more parameters of a model. The network device may generate a combined set of delta values based, at least in part, upon each of the two or more sets of delta values. The network device may generate a combined set of weights or provide the combined set of delta values for use in generating the combined set of weights. The combined set of weights may be generated based, at least in part, upon the set of weights and the combined set of delta values. The combined set of weights may then be applied by the network device (e.g., in the form of a revised set of weights) or provided for use by a decisioning component.

Various network devices may be configured or adapted for generating, modifying, transmitting, intercepting, and/or processing data or messages to implement the disclosed functionality. These network devices may include, but are not limited to, servers, routers, and switches. Moreover, the functionality for the disclosed processes may be implemented in software as well as hardware.

Yet another aspect of the invention pertains to computer program products including machine-readable media on which are provided program instructions for implementing the methods and techniques disclosed herein, in whole or in part. Any of the methods of this invention may be represented, in whole or in part, as program instructions that can be provided on such machine-readable media. In addition, the invention pertains to various combinations and arrangements of messages, components and/or processes as described herein. For example, instructions for generating, modifying, transmitting, intercepting, and/or processing messages described herein may be provided on appropriate media.

These and other features of the present invention will be described in more detail below in the detailed description and in conjunction with the following figures.

DETAILED DESCRIPTION OF THE SPECIFIC EMBODIMENTS

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

The disclosed embodiments relate to the generation and updating of models by machine learning systems. Automated decision making may be made on data such as customer data based, at least in part, upon the model. Such decisions may include, but are not limited to, the serving of targeted content via a website or other mechanism.

Figure 1:
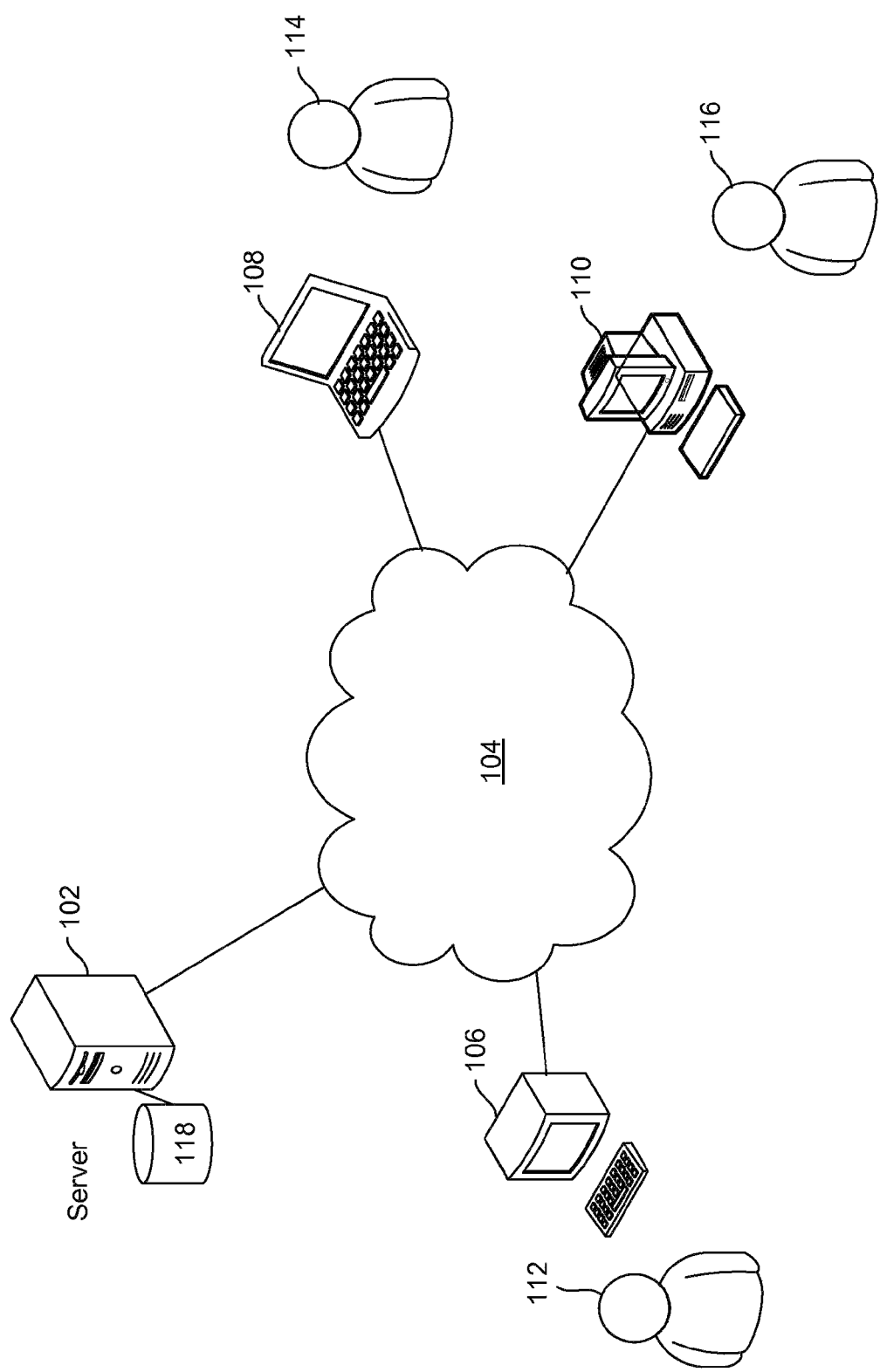
FIG. 1 is a block diagram illustrating an example network in which embodiments of the invention may be implemented.

A machine learning system may generate and/or update a model for use in a variety of systems. FIG. 1 is a diagram illustrating an example network in which embodiments of the invention may be implemented. As shown in FIG. 1, the system may include one or more servers 102 associated with a website. Each of the servers 102 may include one or more processors. The servers 102 may support the generation and/or updating of one or more models, as will be described in further detail below.

The server(s) 102 may enable the website to provide a variety of services to its users. For example, users of the website may purchase products via the website and/or perform searches via the website. In this example, the server(s) 102 may obtain or otherwise receive data (e.g., customer profile data) and/or requests (e.g., search requests or purchase requests) via the Internet 104 from one or more computers 106, 108, 110 in association with corresponding entities 112, 114, 116, respectively. For example, each of the entities 112, 114, 116 may be an individual that is a user (e.g., customer) of the website.

The server(s) 102 may enable the users 112, 114, 116 to submit search queries via the website (e.g., to identify products that the user wishes to purchase) and/or purchase products via the website. In addition, the server(s) may enable the users 112, 114, 116 to generate and/or modify a customer profile pertaining to the user. The customer profile may define various features of the user. For example, the customer profile may include personal information such as residence address, zip code, gender, and/or age. In, addition, the customer profile may include information pertaining to the user's website activities, such as search activities or purchase activities. Thus, the customer profile may include information pertaining to the user's previous purchases, credit card information, etc. The customer profile may also include information indicating the user's responses to customer decisions such as content serving decisions made by the server(s) 102. For example, the customer profile may store information indicating whether the user responded to a particular content serving decision by clicking on content (e.g., product information or offer(s)) provided to the user by the server(s) 102 or by purchasing a product represented by the content presented to the user by the server(s) 102.

Data such as customer profile information may be retained in one or more data stores 118, which may correspond to multiple distributed devices and data stores. The data may be used for a variety of purposes including, but not limited to, generating and/or updating a model for use in automated decision making. More particularly, a model may be used together with customer profile information for a particular user (or set of users) to make a customer decision for that particular user (or set of users). The data stores 118 may also store data pertaining to model(s), as well as data pertaining to the generation and/or update of the model(s).

A customer decision may include one or more actions to be taken with respect to a user. A customer decision may be selected from a set of permissible actions that can be taken with respect to the particular user. For example, each of the set of permissible actions may be associated with a different category of user. As another example, a plurality of sets of permissible actions may be stored, where each set of permissible actions is associated with a different category of user. In this manner, it is possible to appeal to different segments of the population.

In accordance with various embodiments, a model may be applied to customer data to categorize a particular user or otherwise identify an appropriate customer decision. Thus, an action to be taken with respect to a user may be selected from a set of permissible actions based, at least in part, upon a result of applying the model to customer profile data of the user. As one example, a customer decision may include selection of targeted content such as one or more product suggestions or special offers to be served via the website or another mechanism such as electronic mail or Short Message Service (SMS) messages.

In accordance with various embodiments, a customer decision may be triggered via a trigger event. As one example, a trigger event may include the arrival of the user at a particular web page of the website. As another example, a trigger event may include the purchase of a particular product, the clicking on information pertaining to a particular product, or the saving of information pertaining to a particular product in the user's shopping cart.

In accordance with various embodiments, the generation or updating of a model may be performed via a Learning Decisioning System including multiple components. More particularly, the Learning Decisioning System may include two or more decisioning components, where each of the decisioning components implements an automated machine learning system. Since the Learning Decisioning System may include any number of decisioning components, the Learning Decisioning System is scalable for use in any type of network environment.

Machine learning systems may periodically rebuild an off-line model using a current set of data, then apply this model for decision making until the next rebuild. Alternatively, machine learning systems may incrementally update a model as customer decisions are made and responses to those customer decisions are known. Through the use of a model, predictions as to likely responses of users to system-generated customer decisions may be produced. Accordingly, a model may be applied to customer data to select a customer decision that is appropriate for a particular user.

In accordance with various embodiments, the Learning Decisioning System may incrementally update one or more models based, at least in part, upon data in the data stores 118 (e.g., customer data). The data may indicate user features across website user events. Example website user events include, but are not limited to, the visiting of the customer website by a user, clicking on targeted content by a user, providing an offer to a user, and a purchase by a user of one or more products offered for sale via the website.

The user features may include features of users interacting with the website via website user events. More particularly, features of the users may be personal to the user and independent from the website user events. For example, such features may include age, gender, zip code, etc. Moreover, the user features may include features of the website user events during which the users interact with the website. More particularly, the features of website user events may be independent from the features of the users. Example features of website user events include, but are not limited to, the day of the week of a website visit by a user, number of times the user visited the website, acceptance or rejection of an offer provided to the user, the number of products purchased by the user via the website, and/or the value of a purchase by the user of one or more products offered for sale via the website. Therefore, each time a user visits the customer website, user features such as personal features of the user and/or features of the website user events may be obtained and stored in the data stores 118. Therefore, the data stores 118 may store data associated with a plurality of users.

Each of the decisioning components may be statically and/or dynamically configured with the same model. However, each of the decisioning components may periodically and incrementally update its own local copy of the model using a different set of data. Since each of the decisioning components may process a different set of data, each of these models may differ. Through the disclosed embodiments, these models may be "combined" to generate a single model.

Figure 2:
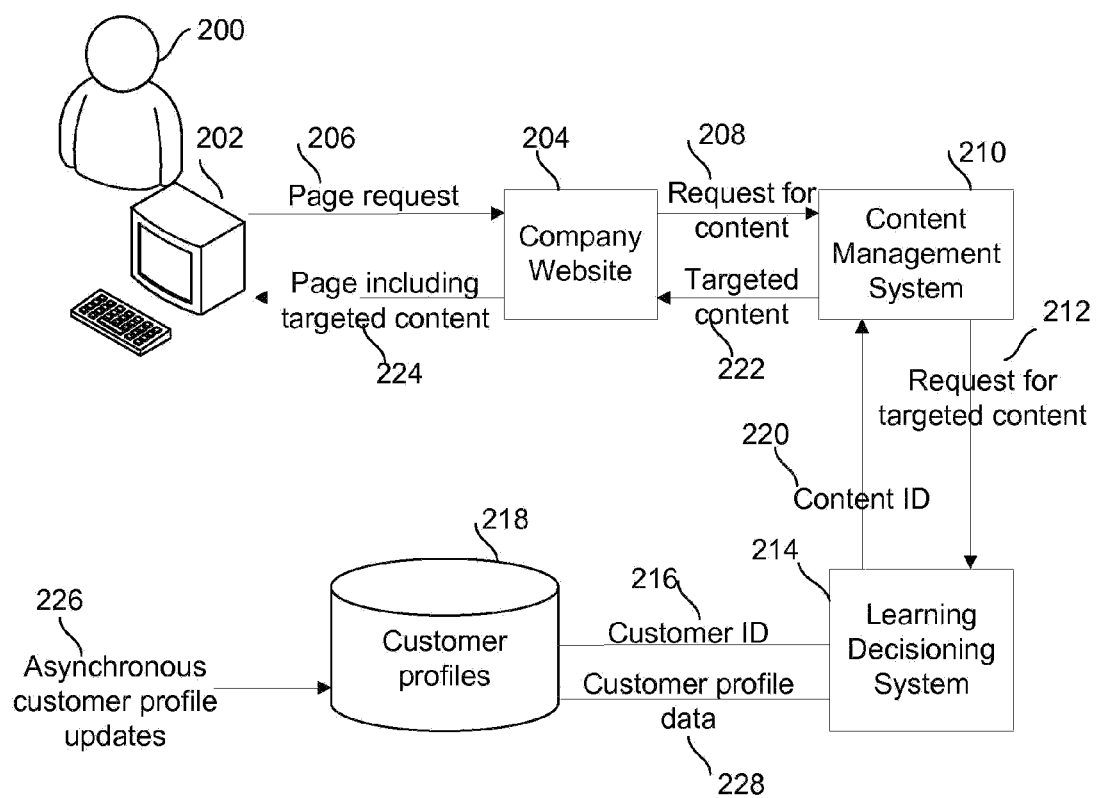
FIG. 2 is a block diagram illustrating an example system in which embodiments of the invention may be implemented.

FIG. 2 is a diagram illustrating an example system in which embodiments of the invention may be implemented. As shown in FIG. 2, a user 200 may connect via a computer 202 via the Internet to a website such as a Company Website 204. More particularly, the user 200 may connect via a web browser of the computer 202, which submits a web page request 206 to the Company Website 204. Web pages are typically requested and served from web servers using Hypertext Transfer Protocol (HTTP).

Upon receiving the page request 206, the Company Website 204 may identify content that is appropriate to provide to the user 200. In this example, the Company Website 204 may send a request for content 208 to a Content Management System 210 that manages content that may be provided to users. More particularly, the Content Management System 210 may store content information for each of a plurality of content options, which may each be identified by a corresponding content identifier (ID). For example, content options may pertain to content such as products and/or special offers.

In accordance with various embodiments, each of a plurality of content options may pertain to a different one of a plurality of products offered for sale via the Company Website 204. Thus, the Content Management System 210 may store product information pertaining to each of the plurality of products that may be purchased via the website. For example, the product information for a particular product may include a product title, product description, price, and/or one or more photographs illustrating the particular product.

Furthermore, each of the plurality of content options may pertain to a different one of a plurality of offers that may be provided to users. Thus, the Content Management System 210 may store offer information pertaining to each of the plurality of offers that may be provided via the website. For example, an offer may pertain to a particular product. As another example, an offer may provide a general benefit such as free shipping or a coupon worth a particular dollar amount or percentage.

In order to identify one or more content options to provide to the user 200, the Content Management System 210 may send a request for targeted content 212 to a Learning Decisioning System 214 including two or more decisioning components. Each of the decisioning components may implement a machine learning system via a machine learning technique (e.g., algorithm). For example, the decisioning components of the Learning Decisioning System 214 may implement a machine learning technique such as Reinforcement Learning. Since the page request 206 may include information identifying the user, the information identifying the user may be further provided via the requests for content 208, 212. For example, the information identifying the user may include a Customer ID, which may be a cookie ID or some other unique customer identifier. The Learning Decisioning System 214 may use the Customer ID 216 to access the customer profile for the user in the customer profiles 218. Once customer profile information has been obtained from the customer profile, the Learning Decisioning System 214 may make a customer decision such as select appropriate targeted content for the user 200 based, at least in part, upon the customer profile information and a model, which may be generated and/or updated, as will be described, in further detail below. Upon identifying the appropriate targeted content for the user, the Learning Decisioning System 214 may send a content ID 220 identifying targeted content to the Content Management System 210. The Content Management System 210 may retrieve and send targeted content 222 identified by the content ID 220 via the Company Website 204, which provides a web page including the targeted content 224 via the computer 202 to the user 200.

In accordance with various embodiments, the Learning Decisioning System 214 may make a customer decision such as select appropriate targeted content for the user by applying a model to customer profile information retrieved from the user's customer profile. For example, through the use of a model, the Learning Decisioning System 214 may generate a score using customer profile information retrieved from the user's customer profile. A model may be implemented in many ways. For example, a model may be implemented via a set of mathematical equations including a plurality of variables. Each of the variables may represent a different user feature. For example, a variable may represent a user feature such as age or gender of users across various website user events.

Each equation may correspond to a possible action that may be taken with respect to a user. A value for each of the variables representing user features may be retrieved for a particular user from the customer profile information for that user. In the mathematical equation, a set of weights may include a weight associated with each corresponding variable (i.e., parameter) of one or more of the plurality of variables. For example, a model may be represented by a mathematical equation such as $A_iX+B_iY+C_iZ=R_i$, where X represents feature 1 (e.g., age<=20), Y represents feature 2 (e.g., gender=F), and Z represents feature 3 (e.g., number of times the user has visited the website>=15 and <20), $A_i$ is a weight (i.e., multiplying factor) associated with variable X to score action i, $B_i$ is a weight associated with variable Y to score action i, $C_i$ is a weight associated with variable Z to score action i, and $R_i$ represents the numerical result determining the score of an action to be taken with respect to the user. Some mechanism may then be applied to determine which action to take from the various values of $R_i$. One possible method is simply to select the action $R_i$ with the largest score.

In accordance with various embodiments, model generation and/or updating may be performed using data associated with variable(s) of various types. For example, models may be generated and/or updated for variables including ordinal, continuous, discrete, nominal, and/or binary variables. Non-numerical data values for various variables may be represented via numerical or binary values. For example, a nominal variable may have each of a finite number of its possible values mapped to a binary value of 1 with any other value mapped to a binary value of 0.

The generation of a model and corresponding weights may be determined through the use of customer profile information collected for a plurality of customers over time. More particularly, a data model may be generated or updated based, at least in part, upon data values collected for one or more parameters of the model.

In accordance with various embodiments, the model may be generated and updated through the Learning Decisioning System 214. More particularly, each of the decisioning components may generate or update its own local set of weights, which may represent the local model being implemented by that decisioning component. Through the use of the separate local sets of weights (or corresponding information), the Learning Decisioning System 214 may "combine" the different local sets of weights to generate and/or update a set of weights of the model, which may be referred to as a combined set of weights. The combined set of weights may then be applied by each of the decisioning components. Various mechanisms of combining the different sets of weights (or models) will be described in further detail below.

Once a customer decision for the user and an outcome of that decision has been identified, the customer decision and outcome may be recorded in the form of an update 226 to the customer profile for the user. For example, the outcome may include the user clicking on the targeted content, ignoring the targeted content, purchasing the product identified in the targeted content, or applying a special offer provided in the targeted content. Therefore, recently obtained or updated raw customer profile data 228 from the user's customer profile may be stored in the Customer Profiles 218. In addition, profile data 228 may retrieved from the Customer Profiles 218 for use by the Learning Decisioning System 214. More particularly, data such as numerical values corresponding to each of a plurality of user features (and corresponding variables) may be stored.

The Learning Decisioning System 214 may access customer profile data for each of one or more variables to generate customer decisions for users. More particularly, the Learning Decisioning System 214 may periodically generate or update the model based, at least in part, upon the customer profile data. Since the customer profile data may indicate user responses to customer decisions, the Learning Decisioning System 214 may learn the best targeting content options to provide to various categories of users. Furthermore, through the generation of a model, the Learning Decisioning System 214 may generalize and predict user responses based upon previously stored data.

In accordance with various embodiments, a model may be generated or updated off-line. Alternatively, in order to build models that reflect current data, a model may be generated or updated on-line incrementally as data is received, obtained, and/or processed. Through the generation and/or updating of models in real-time, the models may be dynamically modified in a real-time data environment.

The functional blocks shown and described above with reference to FIG. 2 may be implemented via one or more servers. In addition, it is important to note that the functional blocks are merely illustrative. Therefore, the disclosed embodiments may be implemented in other contexts or systems.

Figure 3:
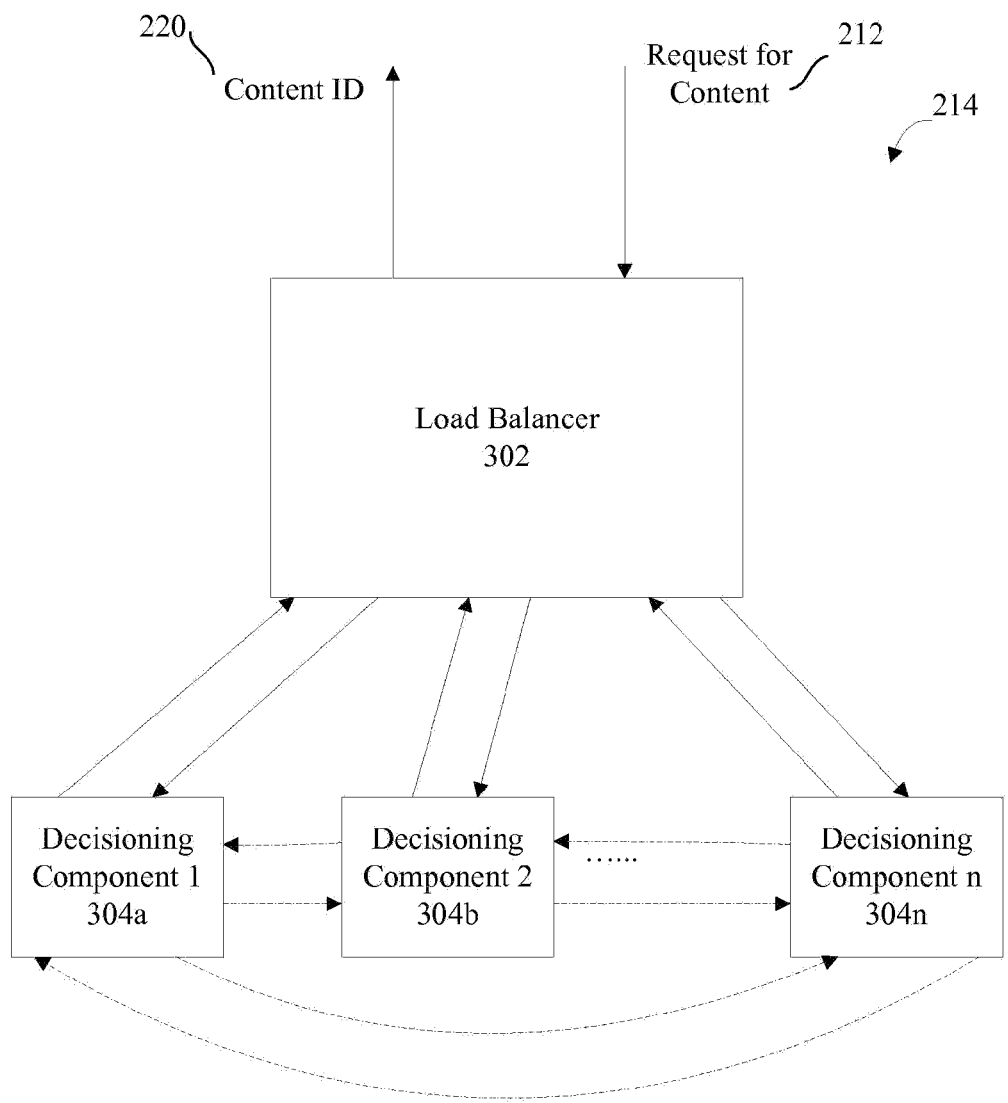
FIG. 3 is a block diagram illustrating an example Learning Decisioning System in accordance with one embodiment.

FIG. 3 is a block diagram illustrating an example Learning Decisioning System in accordance with one embodiment. As shown in this example, the Learning Decisioning System 214 may include a traffic routing component such as a Load Balancer 302 that is configured to obtain data pertaining to one or more users (e.g., where the data pertains to one or more website user events) and distribute the data among a set of two or more decisioning components, shown as Decisioning Component 1 304a, Decisioning Component 2 304b, and Decisioning Component n 304n. For example, the Load Balancer 302 may route traffic in real-time as users interact with the website. As another example, the Load Balancer 302 may access one or more data stores and provide data from the data stores to the Decisioning Components 304a-304n. More particularly, the Load Balancer 302 may obtain a set of customer data pertaining to a set of one or more customers from the data stores and provide the set of customer data to a particular one of the Decisioning Components 304a-304n.

Each of the decisioning components may be implemented via one or more corresponding processors or network devices. Moreover, each of the decisioning components may be implemented by a separate set of one or more processors or network devices, thereby distributing the incremental update process among multiple processors and/or network devices. Periodically, a combine operation may be performed to ensure that the decisioning components may each update their local model in accordance with the models maintained by the other decisioning components. In order to implement a combine operation, the set of decisioning components 304a-304n may communicate with one another to enable updates to the respective local models to be shared. More particularly, each of the decisioning components 304a-304n may generate and/or maintain weight information, that it may communicate with the remaining decisioning components. This weight information may include a current local set of weights maintained by the decisioning component, a set of delta values indicating updates (e.g., changes) to a set of weights that was established previously (e.g., via a prior combine operation) as reflected by the local set of weights, and/or a set of counts indicating the number of times the local set of weights has been updated (e.g., since the prior combine operation). More particularly, the set counts may include a count for each weight in the set of weights. The count for a particular weight (and corresponding parameter) may indicate a number of times the local copy of the weight has been modified (e.g., since the prior combine operation) by the decisioning component.

In accordance with various embodiments, each delta value of a set of delta values corresponds to a different one of the set of weights (and corresponding parameter) and indicates a positive or negative change from the previously established weight to the local weight. A positive change may include any amount of change including zero change. A set of delta values may be obtained by subtracting the prior set of weights from the current local set of weights. More particularly, the delta value for a particular weight may be obtained by subtracting the prior value for that weight from the current local value for that weight. In this manner, a delta value may be generated for each separate weight in the set of weights.

In accordance with various embodiments, each of the set of decisioning components 304a-304n may transmit one or more message(s) that includes weight information corresponding to the local model implemented via the decisioning component to the other decisioning components. In other words, the decisioning components 304a-304n may communicate information directly with one another, rather than via a third party component. For example, the decisioning components 304a-304n may communicate with one another by sending a broadcast message directed to a group address associated with the decisioning components 304a-304, Through the transmission of these messages, each of the set of decisioning components 304a-304n may collect the weight information from each of the other decisioning components. Alternatively, the decisioning components 304a-304n may communicate with one another by storing information to one or more shared data stores or otherwise transmitting information for storage to one or more shared data stores. Each of the decisioning components 304a-304n may separately combine the weight information received or otherwise obtained from each of the other decisioning components with its own weight information to generate combined weight information such as a combined set of delta values and/or a combined (e.g., revised) set of weights.

A combined set of delta values may include a combined delta value for each weight in the set of weights. A combined set of delta values may be generated through the application of one or more combination mechanisms. Mechanisms for generating a combined set of delta values will be described in further detail below.

A combined set of weights may include a combined weight for each weight in the set of weights. More particularly, a combined set of weights may be generated by adding the combined set of delta values to the set of weights corresponding to the prior model. Stated another way, a new weight for a particular parameter may be obtained by summing a combined delta value for that parameter and the prior weight for that parameter value (as determined from the set of weights).

Each of the decisioning components 304a-304n may replace its current local set of weights with the combined set of weights, thereby updating the model. However, the decisioning components 304a-304n may also continue to maintain the prior set of weights for generation of delta values for the subsequent combine operation.

Figure 4:
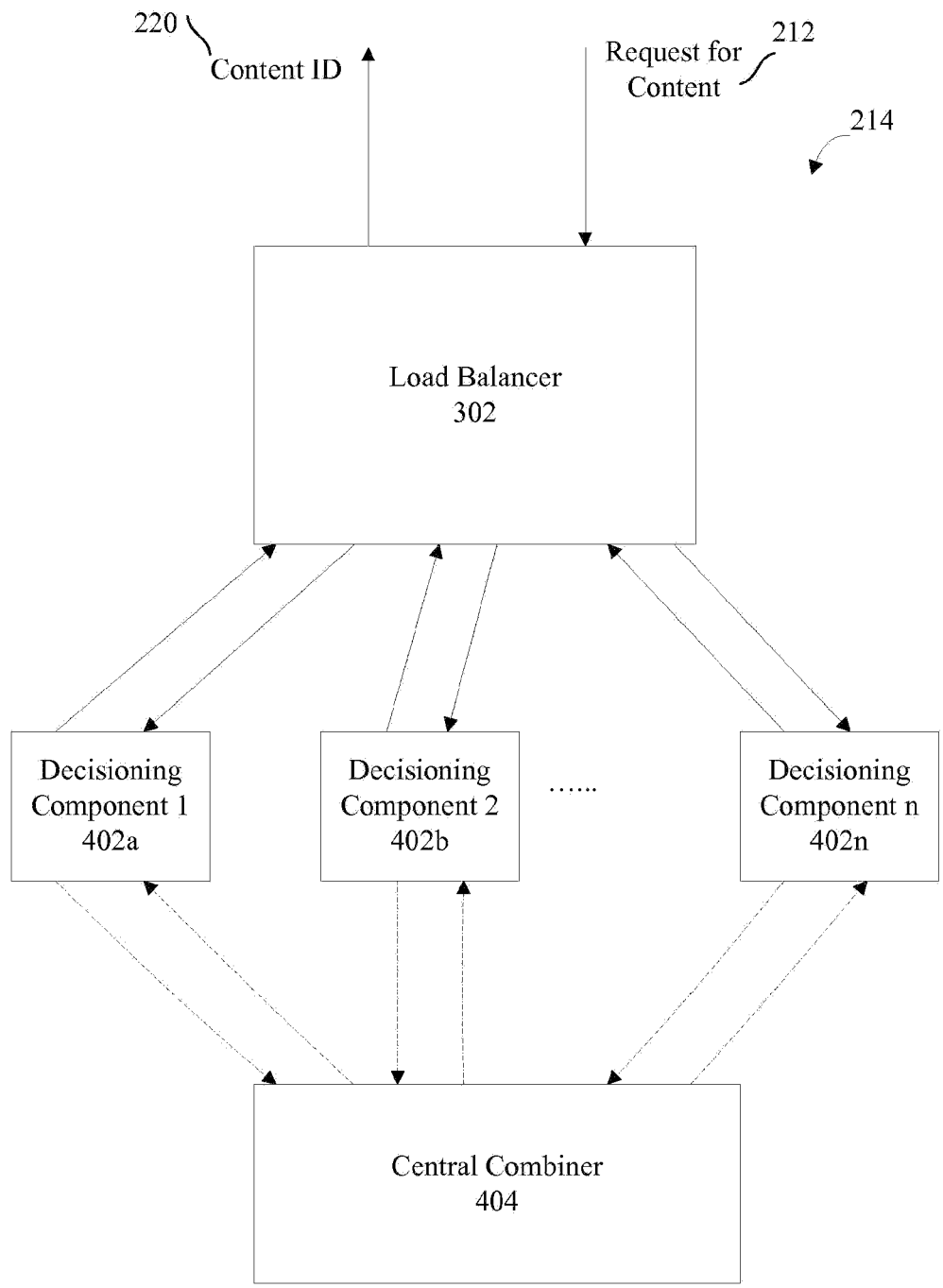
FIG. 4 is a block diagram illustrating an example Learning Decisioning System in accordance with another embodiment.

FIG. 4 is a block diagram illustrating an example Learning Decisioning System in accordance with another embodiment. As shown in this example, the Learning Decisioning System 214 may include a Load Balancer 302 that distributes traffic among a set of two or more decisioning components, shown as Decisioning Component 1 402a, Decisioning Component 2 402b, and Decisioning Component n 402n. Each of the decisioning components may be implemented via separate processors or network devices. Periodically, a combine operation may be performed to ensure that the decisioning components may each update their local model in accordance with the local model maintained by the other decisioning components. In order to implement a combine operation, the set of decisioning components 402a-402n may communicate with a central combiner 404 to enable updates to the respective local models to be shared. More particularly, each of the decisioning components 402a-402n may generate and/or maintain weight information that it may communicate with the combiner 404. As set forth above, this weight information may include a prior set of weights (e.g., applied by all decisioning components), a local set of weights maintained by the decisioning component, delta values indicating updates to a set of weights that was established previously (e.g., via a prior combine operation) as reflected by the local set of weights, and/or a set of counts indicating the number of times each of the local set of weights has been modified by the decisioning component (e.g., since the prior combine operation).

Each delta value of a set of delta values may correspond to a different one of the set of weights (and corresponding parameter) and indicates a positive (including zero) or negative change from the previously established weight in the set of weights and the local weight. A set of delta values may be obtained by subtracting the prior set of weights from the local set of weights. In this manner, a delta value may be generated for each separate weight in the set of weights.

In accordance with various embodiments, each of the set of decisioning components 402a-402n may transmit a message that includes weight information corresponding to the local model implemented via the decisioning component to the combiner 404. Thus, through the transmission of these messages, the combiner 404 may collect the weight information from each of the decisioning components 402a-402n. Alternatively, the decisioning components 304a-304n may communicate with the combiner by storing information to one or more data stores accessible by the combiner or otherwise transmitting information for storage to one or more data stores accessible by the combiner.

The combiner 404 may combine the weight information received or otherwise obtained from each of the other decisioning components to generate combined weight information such as a combined set of delta values and/or a combined (e.g., revised) set of weights. The combiner 404 may then provide this combined weight information to the decisioning components 402a-402n. More particularly, the combiner 404 may transmit the combined weight information to the decisioning components 402a-402n (e.g., via a group address) and/or store the combined weight information to one or more data stores. As set forth above, a combined set of delta values may include a combined delta value for each weight in the set of weights. Mechanisms for generating a combined set of delta values will be described in further detail below. A combined set of weights may include a combined weight for each weight in the set of weights. Where the combined weight information provided to the decisioning components 402a-402n includes a combined set of delta values, each of the decisioning components 402a-402n may separately generate the combined set of weights from the combined set of delta values. Each of the decisioning components 402a-402n may replace its local set of weights with the combined set of weights, thereby updating the model. However, the decisioning components 402a-402n may also continue to maintain the prior set of weights for generation of delta values during the subsequent combine operation.

Various methods of periodically and incrementally updating a model within a distributed system such as that described above with reference to FIGS. 3-4 will be described below with reference to FIGS. 5-7. Although these methods are illustrated as a single process flow, it is important to note that these methods are iterative processes. Iterations of these processes may be performed periodically. For example, the processes may be performed after a predetermined period of time has lapsed, or in response to the occurrence of a particular event (e.g., after the receipt of a pre-defined number of data values).

The decisioning components may operate independently from one another. As a result, the decisioning components may operate in parallel to perform model update processes such as those described herein. Thus, the generation of a local set of weights and/or corresponding set of delta values may be performed simultaneously by the decisioning components. Since the various operations performed to generate or update a model may be distributed among multiple components, the generation or updating of a model may be performed in an efficient manner in real-time.

Figure 5:
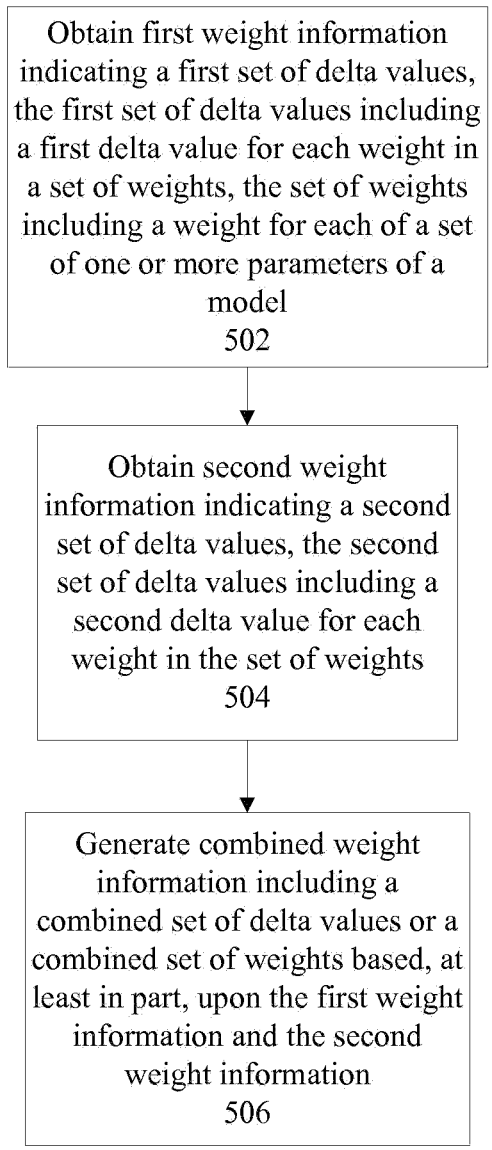
FIG. 5 is a process flow diagram illustrating an example method of incrementally updating a model by a network device implementing a decisioning module or combiner in accordance with various embodiments.

FIG. 5 is a process flow diagram illustrating an example method of incrementally updating a model by a network device (e.g., a processor) implementing a decisioning module or combiner in accordance with various embodiments. A network device (e.g., decisioning module or combiner) may obtain first weight information indicating a first set of delta values at 502. More particularly, the first weight information may be generated by a first decisioning component. Thus, the first weight information may be received or otherwise obtained from the first decisioning component by other decisioning component(s) or a combiner via a message sent by the first decisioning component. Such a message may be sent unsolicited, or may be sent in response to the sending of a request for the first weight information to the first decisioning component. The network device may obtain second weight information indicating a second set of delta values at 504. More particularly, the second weight information may be generated by a second decisioning component. Thus, the second weight information may be received or otherwise obtained from the second decisioning component by other decisioning component(s) or a combiner (e.g., via a message sent by the second decisioning component or via a shared data store). A message including the second weight information that is sent by the second decisioning component may be unsolicited, or may be sent in response to the sending of a request for the second weight information to the second decisioning component.

The first set of delta values may include a first delta value for each weight in a set of weights, where the set of weights includes a weight for each parameter of a set of one or more parameters of a model. The first set of delta values may represent changes to the set of weights based upon a first set of data received or otherwise obtained by a first one of the two or more decisioning components. Similarly, the second set of delta values may include a second delta value for each weight in the set of weights. The second set of delta values may represent changes to the set of weights based upon a second set of data received or otherwise obtained by a second one of the two or more decisioning components.

The first weight information may include the first set of delta values or, alternatively, may include a first set of weights indicating the first set of delta values. In other words, the difference between the (prior) set of weights and the first set of weights generated by the first decisioning component may be represented by the first set of delta values. Similarly, the second weight information may include a second set of delta values or, alternatively, may include a second set of weights indicating the second set of delta values. Stated another way, the difference between the (prior) set of weights and the second set of weights generated by the second decisioning component may be represented by the second set of delta values. The first weight information and second weight information may also include the prior set of weights (e.g., applied by all decisioning components) and/or a set of counts including a count for each weight in the set of weights, where a count indicates the number of times a corresponding one of the set of weights has been updated (e.g., since the prior combine operation) by the corresponding decisioning component.

The network device may generate combined weight information at 506 including a combined set of delta values and/or a combined set of weights based, at least in part, upon the first weight information and the second weight information. For example, a combined set of weights may be generated based, at least in part, upon the set of weights, the first weight information, and the second weight information. More particularly, the network device may generate a combined set of delta values through the application of one or more mechanisms, as will be described in further detail below. The combined set of weights may be generated by adding the combined set of delta values to the set of weights corresponding to the prior model, resulting in a combined set of weights.

Where the process shown and described with reference to FIG. 5 is implemented by a third component such as a combiner, the combiner may provide the combined weight information to each of the decisioning components (e.g., the decisioning components from which the first and second weight information have been obtained). Wherein the combined weight information generated by or provided to the decisioning components includes a combined set of delta values, the decisioning components may each generate the combined set of weights based, at least in part, upon the set of weights and the combined set of delta values. Alternatively, the process may be performed entirely by each separate decisioning component.

Once a combined, revised set of weights is generated, the set of weights may be replaced by the combined set of weights such that the model is updated. After the set of weights has been replaced with the combined set of weights, the model may be applied. For example, the model may be applied to generate a customer decision based, at least in part, upon data pertaining to a user accessing a web site. The prior set of weights may also be maintained, enabling a set of delta values to be generated for a subsequent combine operation.

The examples described herein generally illustrate the disclosed embodiments in which two decisioning modules are implemented. However, it is important to note that these examples are merely illustrative. Therefore, the disclosed embodiments may also be implemented by a greater number of decisioning modules.

Figure 6:
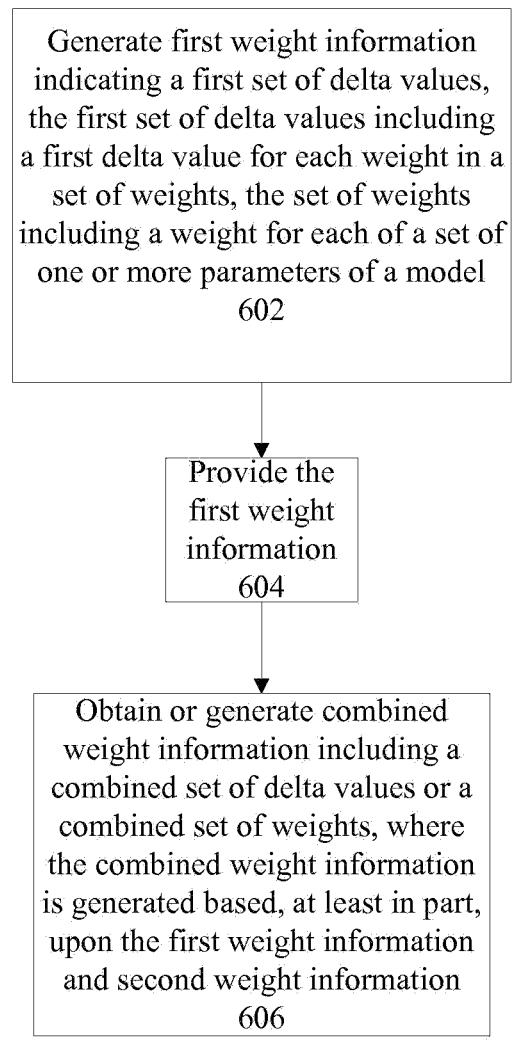
FIG. 6 is a process flow diagram illustrating an example method of incrementally updating a model by a network device implementing a decisioning module in accordance with various embodiments.
Figure 7:
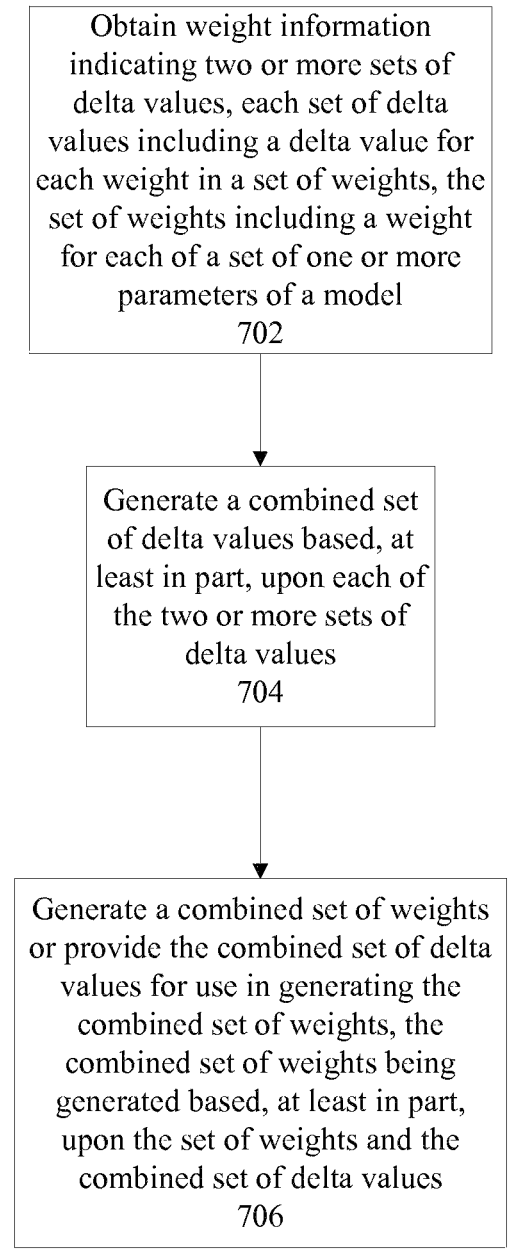
FIG. 7 is a process flow diagram illustrating an example method of combining two or more sets of delta values by a network device implementing a decisioning module or combiner in accordance with various embodiments.

FIG. 6 is a process flow diagram illustrating an example method of incrementally updating a model by a network device implementing a decisioning component in accordance with various embodiments. The network device may generate first weight information indicating a first set of delta values at 602. More particularly, the first weight information may include the first set of delta values or a first set of weights indicating the first set of delta values. The first set of delta values may include a first delta value for each weight in a set of weights, where the set of weights include a weight for each of a set of one or more parameters of a model. The first weight information may also include a prior set of weights (e.g., applied by all decisioning components and/or combiner) and/or a set of counts indicating the number of times each of the set of weights has been modified (e.g., since the prior combine operation) by the decisioning component.

The network device may provide the first weight information at 604 to a combiner. More particularly, the first weight information may be provided via the transmission of one or more messages and/or through the storing of the first weight information to one or more shared data stores. The network device may obtain (e.g., from a combiner) or generate combined weight information including a combined set of delta values or a combined set of weights at 606, where the combined information is generated based, at least in part, upon the first weight information and second weight information. More particularly, the combined weight information may be obtained from a combiner via the receipt of one or more messages from the combiner and/or through obtaining the combined weight information from one or more data stores. The second weight information may include a second set of delta values or a second set of weights indicating the second set of delta values, where the second set of delta values includes a second delta value for each weight in the set of weights. A combined set of delta values may be generated through the application of one or more mechanisms, as will be described in further detail below.

Where the combined weight information received or otherwise obtained from the combiner includes a combined set of delta values, the network device may generate a combined set of weights based, at least in part, upon the combined set of delta values and the set of weights. More particularly, the network device may add the combined set of delta values to the set of weights corresponding to the prior model, resulting in a combined set of weights.

Where the Decisioning System does not include a combiner, the decisioning components may communicate directly with one another. Therefore, the decisioning component may receive or otherwise obtain weight information indicating a corresponding set of delta values from one or more other decisioning components. The decisioning component may generate the combined weight information from the first weight information and the weight information, received or otherwise obtained from the other decisioning component(s).

Once the combined set of weights is generated, received, or otherwise obtained, the network device may replace its local set of weights with the combined set of weights such that the local model is updated. In addition, the network device may store the set of weights as the prior set of weights, enabling the network device to subsequently generate a set of delta values and/or corresponding local set of weights.

In accordance with various embodiments, a combined set of weights may be generated based, at least in part, upon two or more sets of delta values. FIG. 7 is a process flow diagram illustrating an example method of combining two or more sets of delta values by a network device such as a decisioning module or combiner in accordance with various embodiments. A network device may obtain weight information indicating two or more sets of delta values at 702, where each set of delta values includes a delta value for each weight in a set of weights, and where the set of weights includes a weight for each of a set of one or more parameters of a model. More particularly, the weight information may include two or more sets of delta values (e.g., where each set of delta values is generated by a different decisioning module). Alternatively, the weight information may include two or more local sets of weights (e.g., where each local set of weights is generated by a different decisioning module).

Each of the two or more sets of delta values may be ascertained from two or more local sets of weights, where each of the sets of delta values indicates positive and/or negative change(s) from the set of weights to the respective one of the two or more local sets of weights. Stated another way, one of the two or more sets of delta values may be obtained by subtracting the prior set of weights from a particular one of the two or more local sets of weights. More particularly, for each parameter of the model, a delta value may be obtained by subtracting the prior weight for that parameter (as identified in the set of weights) from the weight for that parameter as identified in the particular local set of weights. In this manner, a delta value may be generated for each weight in the set of weights.

The network device may generate a combined set of delta values at 704 based, at least in part, upon each of the two or more sets of delta values. Various mechanisms for combining two or more sets of delta values will be described in further detail below.

In some embodiments, the weight information obtained at 702 may also include a prior set of weights (e.g., applied by all decisioning components) and/or two or more sets of counts, where each set of counts may indicate the number of times each weight in the set of weights has been updated (e.g., since the prior combine operation) by the corresponding decisioning component (as reflected by the local set of weights). Thus, the combined set of delta values may be generated at 704 based, at least in part, upon the two or more sets of delta values and the two or more sets of counts.

The network device may generate a combined set of weights, or may provide the combined set of delta values for use in generating the combined set of weights at 706, where the combined set of weights is generated based, at least in part, upon the set of weights and the combined set of delta values. More particularly, where the process is performed by a decisioning module, the decisioning module may save the prior set of weights, and generate and apply the combined set of weights as an updated model. However, where the process is performed by a combiner, the combiner may provide the combined set of delta values (or a combined set of weights) for use by the decisioning modules.

Once the combined set of delta values is obtained, the combined set of weights may be generated and applied in the form of an updated model (e.g., by replacing the prior set of weights with the combined set of weights). More particularly, a combined set of weights may include a combined weight for each weight in the set of weights. A combined set of weights may be generated by adding the combined set of delta values to the set of weights corresponding to the prior model. Stated another way, a new weight for a particular parameter may be obtained by summing a combined delta value for that parameter and the prior weight for that parameter value (as determined from the set of weights).

A decisioning component may update its local set of weights and/or delta values periodically. For example, each decisioning component may update its local set of weights and/or its set of delta values in response to a particular event, such as after pre-determined number of data values have been received or otherwise obtained by the decisioning module. As another example, such updates may be performed periodically after a predetermined period of time has elapsed (e.g., 1 second) independent of the number of data values have been received or otherwise obtained.

Combination of Two or More Sets of Delta Values

Weight information indicating two or more sets of delta values may be "combined" using one or more combination techniques such as those described below. More particularly, for each of one or more weights in a set of weights, the delta value for that weight may be obtained from each of the two or more sets of delta values such that two or more delta values for the weight are obtained. In this manner, the delta value indicating the weight change perceived by each of the decisioning components for the particular weight may be obtained and grouped together. The two or more delta values that have been obtained for the weight may be combined to generate a single combined delta value for that weight.

The following example techniques are described with reference to the combination of two or more delta values for a single weight in the set of weights. However, it is important to note that the techniques may also be applied to multiple weights in the set of weights. More particularly, one or more of the combination techniques may be applied to each of the weights in the set of weights.

In order to simplify the description, various combination techniques will be described separately. However, it is important to note that techniques such as the eight example techniques described below may be applied separately or in combination with one another to combine two or more delta values for a particular weight.

Technique 1: Extreme Value Technique

For a given weight, the positive delta values corresponding to positive changes to the weight may be grouped together. Similarly, the negative delta values corresponding to negative changes to the weight may be grouped together. Accordingly, the positive delta values may be processed separately from the negative delta values.

The largest positive value in the two or more delta values for the weight may be identified. If there is no positive value, zero may be used as the largest positive value. The largest negative value in the two or more delta values for the weight may be identified. If there is no negative value, zero may be used. The combined delta value for the weight may be set to the sum of the largest positive value and the largest negative value.

Technique 2: $n^{th}$ Percentile Technique

In some implementations, the $n^{th}$ percentile technique may be similar in some respects to the extreme value technique described above. More particularly, for a given weight, the positive delta values corresponding to positive changes to the weight may be grouped together. Similarly, the negative delta values corresponding to negative changes to the weight may be grouped together. Accordingly, the positive delta values may be processed separately from the negative delta values.

In addition, the $n^{th}$ percentile technique may take account the distributions of positive and negative changes to a given weight, and may avoid acting on statistical outliers. Any statistical distribution may be used. For example, the distribution may be normal, log-normal, exponential, etc. The distribution may be selected according to the expected characteristics of the data.

In accordance with various embodiments, the mean and variance of the positive delta values may be calculated. If the delta values for the weight do not include a positive value, the mean and/or variance of the positive delta values may be set to zero. Similarly, the mean and variance of the negative delta values may be calculated. If the delta values for the weight do not include a negative value, the mean and/or variance of the negative delta values may be set to zero. The nth percentile of the positive delta values for the weight may be calculated using the mean and variance of the positive deltas values. Similarly, the nth percentile of the negative delta values for the weight may be calculated using the mean and variance of the negative delta values. The combined delta value for the weight may be the sum of the nth percentile of the positive delta values and the nth percentile of the negative delta values. The value of N may be strategically selected based upon factors such as the desired or optimum degree of sensitivity to outliers. For example, the value of N may selected to be any value between 0 and 100. As another example, the value of N may be selected to be any value between 75 and 95.

Technique 3: Traffic Weighted $n^{th}$ Percentile

In some implementations, the traffic weighted $n^{th}$ percentile technique may be similar in some respects to the extreme value technique and/or the $n^{th}$ percentile technique. More particularly, for a given weight, the traffic weighted $n^{th}$ percentile technique may take into account the distributions of positive and negative delta values and may include a weighting for the amount of traffic corresponding to each of the delta values for the weight. Therefore, the weighted $n^{th}$ percentile technique may implement, for each decisioning module (or set of delta values), a count of the number of times the weight has been changed since the last update (e.g., during a period of time since the last combination operation).

For a given weight, the positive delta values corresponding to positive changes to the weight may be grouped together. Similarly, the negative delta values corresponding to negative changes to the weight may be grouped together. Accordingly, the positive delta values may be processed separately from the negative delta values.

The traffic weighted $n^{th}$ percentile technique may take account the distributions of positive and negative changes to a given weight, and may avoid acting on statistical outliers. Any statistical distribution may be used. For example, the distribution may be normal, log-normal, exponential, etc. The distribution may be selected according to the expected characteristics of the data.

In accordance with various embodiments, the traffic weighted mean and traffic weighted variance of the positive delta values may be calculated. If the delta values for the weight do not include a positive value, the traffic weighted mean and/or traffic weighted variance of the positive delta values may be set to zero. For example, if the delta values for the weight (obtained from different sets of delta values or decisioning components) include three positive values {0.1, 0.2, 0.15} with corresponding traffics {2, 2, 3}, then the mean and variance of {0.1, 0.1, 0.2, 0.2, 0.15, 0.15, 0.15} may be calculated. Similarly, the traffic weighted mean and traffic weighted variance of the negative delta values may be calculated. If the delta values for the weight do not include a negative value, the traffic weighted mean and/or traffic weighted variance of the negative delta values may be set to zero. The nth percentile of the positive delta values for the weight may be calculated using the traffic weighted mean and traffic weighted variance of the positive deltas values. Similarly, the nth percentile of the negative delta values for the weight may be calculated using the traffic weighted mean and traffic weighted variance of the negative delta values.

The combined delta value for the weight may be the sum of the nth percentile of the positive delta values and the nth percentile of the negative delta values. The value of N may be strategically selected based upon factors such as the desired or optimum degree of sensitivity to outliers. For example, the value of N may selected to be any value between 0 and 100. As another example, the value of N may be selected to be any value between 75 and 95.

Technique 4: Mean Delta Value

In some implementations, for a particular weight, the mean change to the weight since the previous combination operation across the decisioning modules may be calculated. More particularly, the number of changes made to the weight may be tracked by each decisioning module, and the total number of changes to the weight across the decisioning modules may be obtained by summing the number of changes made to the weight by each separate decisioning module. The mean change per update (combination operation) may be calculated by determining a sum of the two or more delta values for the weight divided by the total number of changes to the weight across the decisioning modules. Therefore, the combined delta value for the weight be set to the mean delta value Technique 5: Delta Value with Greatest Number of Changes In other implementations, the delta value with the most changes (by a particular decisioning module) may be selected. This may be determined by comparing the counts maintained by the decisioning modules in association with the weight, where the count indicates the number of times the weight has been changed by the decisioning module since the last update. The selected delta value may represent the greatest number of changes to make to the weight and the maximum weight change that is "safe." Therefore, the combined delta value for the weight may be set to the selected delta value.

Technique 6: Voting

In some implementations, a voting mechanism may be used to establish a combination strategy for using one or more combination techniques for generating a combined delta value for a given weight (or a combined set of delta values for the set of weights). For example, if all or most of the two or more delta values for the given weight are in the same direction (e.g., either positive or negative), then the system may use the largest positive or negative delta value in the two or more delta values. In other words, the system may update the weight according to the speed of the fastest weight change. As another example, if the number of positive changes and the number of negative weight changes are equal or substantially similar, then an averaging strategy may be selected (e.g., a traffic weighted mean). As yet another example, for situations in which the weight changes are neither entirely positive or negative, and the weight changes are not equally positive and negative in number, a proportion of two or more combination strategies may be selected. Therefore, a voting mechanism may be employed to determine a relative contribution of two different combination strategies for generating a combined delta value for the given weight (or the combined set of delta values corresponding to the set of weights).

In some implementations, when a voting mechanism is used for a given weight, the positive delta values corresponding to positive changes to the weight may be grouped together. Similarly, the negative delta values corresponding to negative changes to the weight may be grouped together. Accordingly, the positive delta values may be processed separately from the negative delta values.

Example Scenario

In order to illustrate an example application of a voting technique, an example scenario corresponding to four different decisioning modules will be described. Assume delta values indicating weight changes corresponding to the four decisioning components is {0.1, 0.2, 0.15, −0.15} and traffics corresponding to the four decisioning components is {2, 2, 3, 3}.

The largest positive delta value for the weight (e.g., 0.2) and the largest negative value for the weight (e.g., −0.15) may be determined. If all or most of the delta values for the given weight are in the same direction (e.g., either positive or negative), then the system may use the largest positive or negative delta value (e.g., 0.2) as the combined delta value for the weight. However, in this example, since all or most of the delta values for the weight are not in the same direction (e.g., either positive or negative), then the speed of the fastest weight change may not be applied.

In addition, the traffic weighted mean may be calculated for the weight based upon the weight changes and traffics for the weight. In this example, the traffic weight mean=(0.1*2+ 0.2*2+0.15*3−0.15*3)/10=0.06. As set forth above, the traffic weighted mean may be selected as the combined delta value for the weight if the number of positive changes and the number of negative weight changes are equal or substantially similar. However, since the number of number of positive changes, 3, and the number of negative changes, 1, are not equal or substantially similar, then an averaging strategy such as the traffic weight mean may not be applied.

If the number of positive delta values for the weight exceeds the number of negative values for the weight, then the combined delta value indicating the combined change for the weight may be determined as follows. The number of excess positive values is equal to (number of positive values)−(number of negative values), which in this example is 3−1=2. The number of delta values for the weight is 4 (e.g., corresponding to the number of decisioning components). The number of delta values for the weight−number of excess positive values=4−2=2. Thus, the combined delta value for the weight may be equal to ((largest positive delta value*number excess positives)+(traffic weighted mean* (number of delta values−number excess positives))/number of delta values for the weight=(0.2*2+0.06*(4−2))/4=0.13.

If instead the number of negative delta values for the weight exceeds the number of positive delta values for the weight, then the combined delta value indicating the combined change for the weight may be determined as a weighted sum of the largest negative value and the traffic weighted mean, for instance, weighted according to the number of excess negative values. Thus, the combined delta value for the weight may be equal to ((largest negative delta value*number excess negatives)+(traffic weighted mean*number excess negatives))/number of delta values for the weight.

Technique 7: Momentum Term

In some implementations, a momentum term technique may be used. More particularly, a momentum term technique may speed-up weight convergence among the decisioning components for a particular weight. To implement a momentum term technique, a combined delta value for the particular weight may be ascertained based, at least in part, upon a momentum term. For example, the momentum term may represent a constant multiplied by the previous combined delta value for that weight (e.g., determined at a prior combination operation). The value of the constant may be strategically determined based upon the specific features of the learning system and the goals of a user such as a system administrator.

The combined delta value for the weight may be ascertained solely using the momentum term technique, or in combination with one or more other combination techniques described herein. More particularly, the momentum term may be added to a combined delta value that has been calculated to generate a new combined delta value for the weight. For example, the combined delta value for the weight that is applied may be the previous combined delta value for that weight (e.g., where the combined delta value has been calculated at a prior combination operation). As another example, the combined delta value for the weight that is applied may be calculated using one or more combination techniques such as those described herein (e.g., traffic weighted mean).

The momentum term that is applied for a particular weight (and corresponding parameter) may be the same as the momentum term that is applied for another weight. Alternatively, the momentum that is applied for a particular weight may be different from the momentum term that is applied for another weight. Accordingly, a combined set of delta values for a set of weights may be ascertained through the application of one or more momentum terms to a previously generated combined set of delta values.

Technique 8: Traffic Routing

In some implementations, a traffic routing technique may be used to route traffic among two or more decisioning components. A traffic routing technique may be used to facilitate the combination process. When applying a traffic routing technique, traffic may be routed to one or more decisioning components based, at least in part, on the value of one or more of a set of variables, which may correspond to user features such as those described herein. Values of user features for any given user may be ascertained from a corresponding user profile. In other embodiments, adaptive binning may be performed such that the same or approximately the same amount of traffic is routed to each of the decisioning components.

A traffic routing technique may be applied to increase or maximize the difference between the user feature values observable by each decisioning component. As this difference increases, the combination process increasingly becomes one of addition of the constituent parts rather than aggregation. Alternatively, a traffic routing technique may be applied to decrease or minimize the difference between the user feature values observable by each decisioning component.

In some implementations, traffic routing may be achieved using a technique such as clustering. When using a clustering technique, a sample of the user profiles may periodically be used to create a set of cluster centers. More particularly, a cluster center may correspond to a range of values of one or more variables (e.g., features). For example, a first cluster center may correspond to an age range of 30-39 and a gender of female, while a second cluster center may correspond to an age range of 30-39 and a gender of male. A cluster center may therefore correspond to specific user profiles. The cluster centers may be mapped (e.g., one-to-one) to the set of decisioning components. Traffic may be routed to the decisioning component that has the "shortest distance" between a user profile and its corresponding cluster center. Stated another way, traffic may be routed to the cluster center for which the corresponding value range(s) of the variable(s) most closely match the user features in the user profile.

The disclosed embodiments may be applied separately or in combination to ensure optimal performance in a distributed learning system. The disclosed embodiments may be applied in various scenarios to ensure that information that is learned by each of the decisioning components is "distributed" among the remaining decisioning components. This is particularly advantageous in a variety of situations, such as where a decisioning component detects a large delta in one or more weights as a result of a large perturbation in customer behavior or where a decisioning component generates weights based upon customer behavior that occurs infrequently. Accordingly, through the application of the disclosed embodiments, the revised weights of the updated model that are applied by each of the decisioning components may more accurately and precisely reflect the customer behavior detected (and data received or otherwise obtained) across all of the decisioning modules.

Once generated or updated, a model may be applied to generate customer decisions for users who are customers of a particular website. For example, the model may be applied to identify content to serve the users. Upon applying customer decisions to users, customer profiles may be updated immediately to record the customer decisions. Similarly, customer profiles may be updated with customer responses as the responses are detected. Since the model may be incrementally updated in real-time, customer decisions generated via the model may be made based upon the most recent data available. Accordingly, real-time adaptive model generation or updating may be advantageously implemented in a distributed system to increase click-through rates or otherwise optimize a website or other channel.

Figure 8:
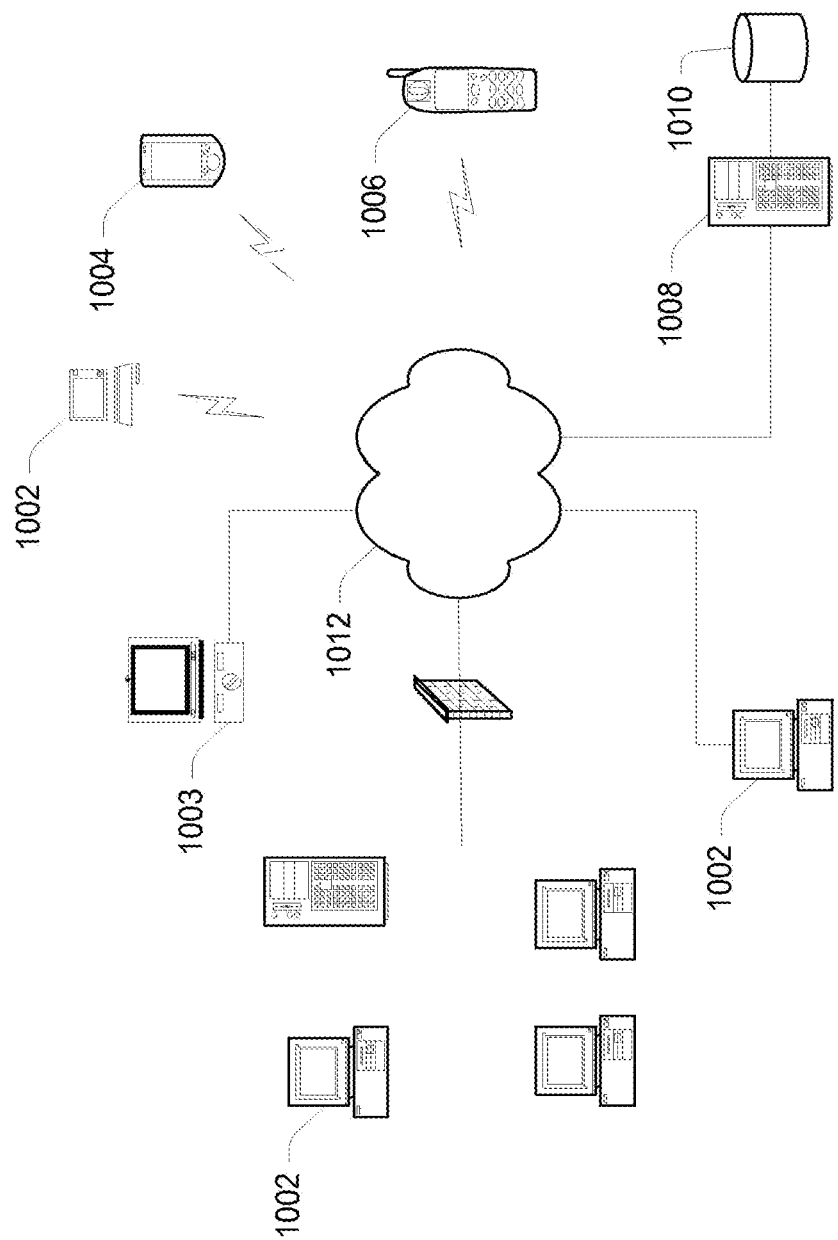
FIG. 8 is a diagram illustrating an example system in which various embodiments may be implemented.

Embodiments of the present invention may be employed in any of a wide variety of computing contexts. For example, as illustrated in FIG. 8, implementations are contemplated in which the relevant population of users interact with a diverse network environment via any type of computer (e.g., desktop, laptop, tablet, etc.) 1002, media computing platforms 1003 (e.g., cable and satellite set top boxes and digital video recorders), handheld computing devices (e.g., PDAs) 1004, cell phones 1006, or any other type of computing or communication platform.

The updating of a model may be performed according to the invention in a distributed manner. One or more components of a Learning Decisioning System, such as a combiner and/or one or more decisioning components, may be represented in FIG. 8 by server 1008 coupled to data store 1010 which, as will be understood, may correspond to multiple distributed devices and data stores. However, it is important to note that while a single server 1008 is shown in this example, the components of a Learning Decisioning System may be implemented via multiple servers.

The disclosed embodiments may also be practiced in a wide variety of network environments (represented by network 1012) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The program instructions may be implemented in an object-oriented language such as C++ or Java. The memory or memories may also be configured to store one or more sets of bins, data values, customer profiles, product information, computer-readable instructions for performing the disclosed methods as described herein, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 9:
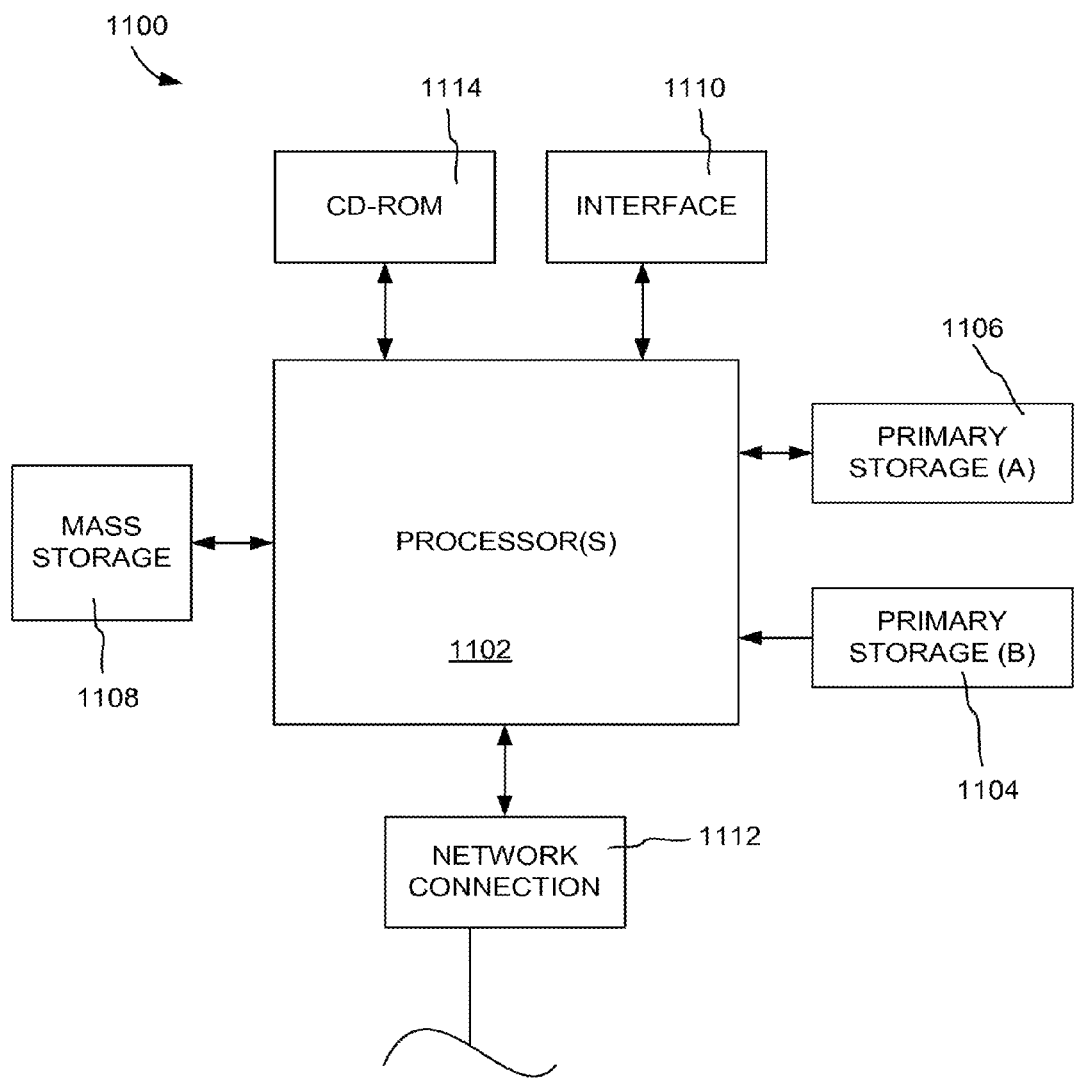
FIG. 9 illustrates an example computer system via which various embodiments may be implemented.

FIG. 9 illustrates a typical computer system that, when appropriately configured or designed, can serve as a system of this invention. The computer system 1100 includes any number of processors 1102 (also referred to as central processing units, or CPUs) that are coupled to storage devices including primary storage 1106 (typically a random access memory, or RAM), primary storage 1104 (typically a read only memory, or ROM). CPU 1102 may be of various types including microcontrollers and microprocessors such as programmable devices (e.g., CPLDs and FPGAs) and unprogrammable devices such as gate array ASICs or general purpose microprocessors. As is well known in the art, primary storage 1104 acts to transfer data and instructions uni-directionally to the CPU and primary storage 1106 is used typically to transfer data and instructions in a bi-directional manner. Both of these primary storage devices may include any suitable computer-readable media such as those described above. A mass storage device 1108 is also coupled bi-directionally to CPU 1102 and provides additional data storage capacity and may include any of the computer-readable media described above. Mass storage device 1108 may be used to store programs, data and the like and is typically a secondary storage medium such as a hard disk. It will be appreciated that the information retained within the mass storage device 1108, may, in appropriate cases, be incorporated in standard fashion as part of primary storage 1106 as virtual memory. A specific mass storage device such as a CD-ROM 1114 may also pass data uni-directionally to the CPU.

CPU 1102 may also be coupled to one or more interfaces 1110 that connect to one or more input/output devices such as such as video monitors, track balls, mice, keyboards, microphones, touch-sensitive displays, transducer card readers, magnetic or paper tape readers, tablets, styluses, voice or handwriting recognizers, speakers, or other well-known input devices such as, of course, other computers. Finally, CPU 1102 optionally may be coupled to an external device such as a database or a computer or telecommunications network using an external connection as shown generally at 1112. With such a connection, it is contemplated that the CPU might receive a user request or information from the network, or might output information to the network in the course of performing the method steps described herein.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A computer-implemented method of delivering targeted content to a user, the method comprising:
    for a set of weights, each weight being applied to a feature of a set of features associated with the user, obtaining from a first decisioning component including a first processor a first weight information indicating a first set of delta values, the first set of delta values including a first delta value for each weight in a set of weights, the set of weights including a weight for each of a set of one or more parameters of a model, the first set of delta values generated by the first decisioning component by subtracting a prior set of local weights for the first decisioning component from a current set of local weights for the first decisioning component;
    obtaining from a second decisioning component including a second processor second weight information indicating a second set of delta values, the second set of delta values including a second delta value for each weight in the set of weights, the second set of delta values generated by the second decisioning component by subtracting a prior set of local weights for the second decisioning component from a current set of local weights for the second decisioning component;
    generating combined weight information including a combined set of delta values and a combined set of weights based, at least in part, upon the first weight information and the second weight information, wherein a single combined delta value for a particular weight is generated based on the first delta value for the particular weight and the second delta value for the particular weight;
    based on the model and the combined weight information generating a score for the user, where the score is determined by multiplying each weight in the combined weight information with a corresponding feature of the set of features and summing the results;
    based on the score, sending a content identification to a content management system; and
    based on the content identification, delivering targeted content to the user.

2. The computer-implemented method of claim 1, further comprising:
    updating the model such that the set of weights is replaced with the combined set of weights.

3. The computer-implemented method of claim 1, wherein each of the set of one or more parameters corresponds to a different one of a set of user features.

4. The computer-implemented method of claim 1, wherein obtaining the first weight information, obtaining the second weight information, and generating the combined weight information is performed by a third component, the method further comprising:
    providing the combined weight information to the first decisioning component and the second decisioning component.

5. The computer-implemented method of claim 1, wherein obtaining the first weight information, obtaining the second weight information, and generating the combined weight information are performed by the first decisioning component, the method further comprising:

transmitting the first weight information to the second decisioning component,
wherein obtaining the second weight information comprises receiving the second weight information from the second decisioning component.

6. The computer-implemented method of claim 1, further comprising:
sending a request to the first decisioning component and the second decisioning component for the first weight information and the second weight information.

7. The computer-implemented method of claim 1, wherein the first weight information comprises a first set of weights indicating the first set of delta values, the second weight information comprises a second set of weights indicating the second set of delta values.

8. The computer-implemented method of claim 1, wherein the first weight information comprises the first set of delta values the second weight information comprises the second set of delta values.

9. The computer-implemented method of claim 1, wherein generating combined weight information comprises:
generating the combined set of weights based, at least in part, upon the set of weights, the first weight information, and the second weight information.

10. The computer-implemented method of claim 9, further comprising:
replacing the set of weights with the combined set of weights.

11. The method of claim 1, comprising:
obtaining from each of a further one or more decisioning components a set of weight information indicating a set of delta values;
wherein generating the combined set of delta values comprises determining for each weight the sum of: the largest positive delta value corresponding to the weight and the most negative delta value corresponding to the weight.

12. The method of claim 1, comprising:
obtaining from each of a further one or more decisioning components a set of weight information indicating a set of delta values;
wherein generating the combined set of delta values comprises determining for each weight the sum of: the nth percentile of the positive delta values corresponding to the weight and the nth percentile of the negative delta values corresponding to the weight.

13. The method of claim 1, wherein generating the combined set of delta values comprises including a traffic weighting for each delta value, the traffic weighting corresponding to a number of times the corresponding weight has been changed.

14. The method of claim 1, wherein generating the combined set of delta values comprises, for each weight, summing the delta values for the weight and dividing the sum by the number of changes to the weight.

15. The method of claim 1, wherein generating the combined set of delta values comprises, for each weight, using the delta value for the weight having the greatest number of changes by a particular decisioning module to the weight.

16. The method of claim 1, comprising:
obtaining from each of a further one or more decisioning components a set of weight information indicating a set of delta values;
wherein generating the combined set of delta values comprises, for each weight, comparing the number of positive delta values and the number of negative delta values.

17. The method of claim 1, wherein generating the combined set of delta values comprises, for a weight, adding to the combined set of delta values a constant multiplied by the previous combined delta value for the weight.

18. The method of claim 1 comprising, for each decisioning component, routing user information to the decisioning component based on user features within the user information.

19. An system for delivering targeted content to a user, comprising:
a first decisioning component including a first processor;
a second decisioning component including a second processor; and
an apparatus comprising:
a processor; and
a memory,
at least one of the processor or the memory being configured to:
for a set of weights, each weight being applied to a feature of a set of features associated with the user obtain from the first decisioning component first weight information indicating a first set of delta values, the first set of delta values including a first delta value for each weight in a set of weights, the set of weights including a weight for each of a set of one or more parameters of a model, the first set of delta values generated by the first decisioning component by subtracting a prior set of local weights for the first decisioning component from a current set of local weights for the first decisioning component;
obtain from the second decisioning component second weight information indicating a second set of delta values, the second set of delta values including a second delta value for each weight in the set of weights, the second set of delta values generated by the second decisioning component by subtracting a prior set of local weights for the second decisioning component from a current set of local weights for the second decisioning component;
generate combined weight information including a combined set of delta values and combined set of weights based, at least in part, upon the first weight information and the second weight information, wherein a single combined delta value for a particular weight is generated based on the first delta value for the particular weight and the second delta value for the particular weight;
based on the model and the combined weight information generate a score for the user, where the score is determined by multiplying each weight in the combined weight information with a corresponding feature of the set of features and summing the results; and
based on the score, send a content identification to a content management system which, based on the content identification, delivers targeted content to the user.

20. A computer-implemented method of delivering targeted content to a user, the method comprising:
for a plurality of sets of weights, each weight being applied to a feature of a set of features associated with the user, obtaining from a plurality of decisioning components each including a processor weight information, the weight information indicating two or more sets of delta values, each set of delta values including a delta value for each weight in a set of weights, the set of weights including a weight for each of a set of one or more parameters of a model, each set of delta values generated by a decisioning component by subtracting a prior set of local weights for the decisioning component from a current set of local weights for the decisioning component;

generating a combined set of delta values based, at least in part, upon each of the two or more sets of delta values, wherein a single combined delta value for a particular weight is generated based on the first delta value for the particular weight and the second delta value for the particular weight;

generating a combined set of weights or providing the combined set of delta values for use in generating the combined set of weights, the combined set of weights being generated based, at least in part, upon the set of weights and the combined set of delta values;

based on the model and the combined weight information generating a score for the user, where the score is determined by multiplying each weight in the combined set of weights with a corresponding feature of the set of features and summing the results;

based on the score, sending a content identification to a content management system; and based on the content identification, delivering targeted content to the user.

* * * * *